UNITED STATES PATENT OFFICE.

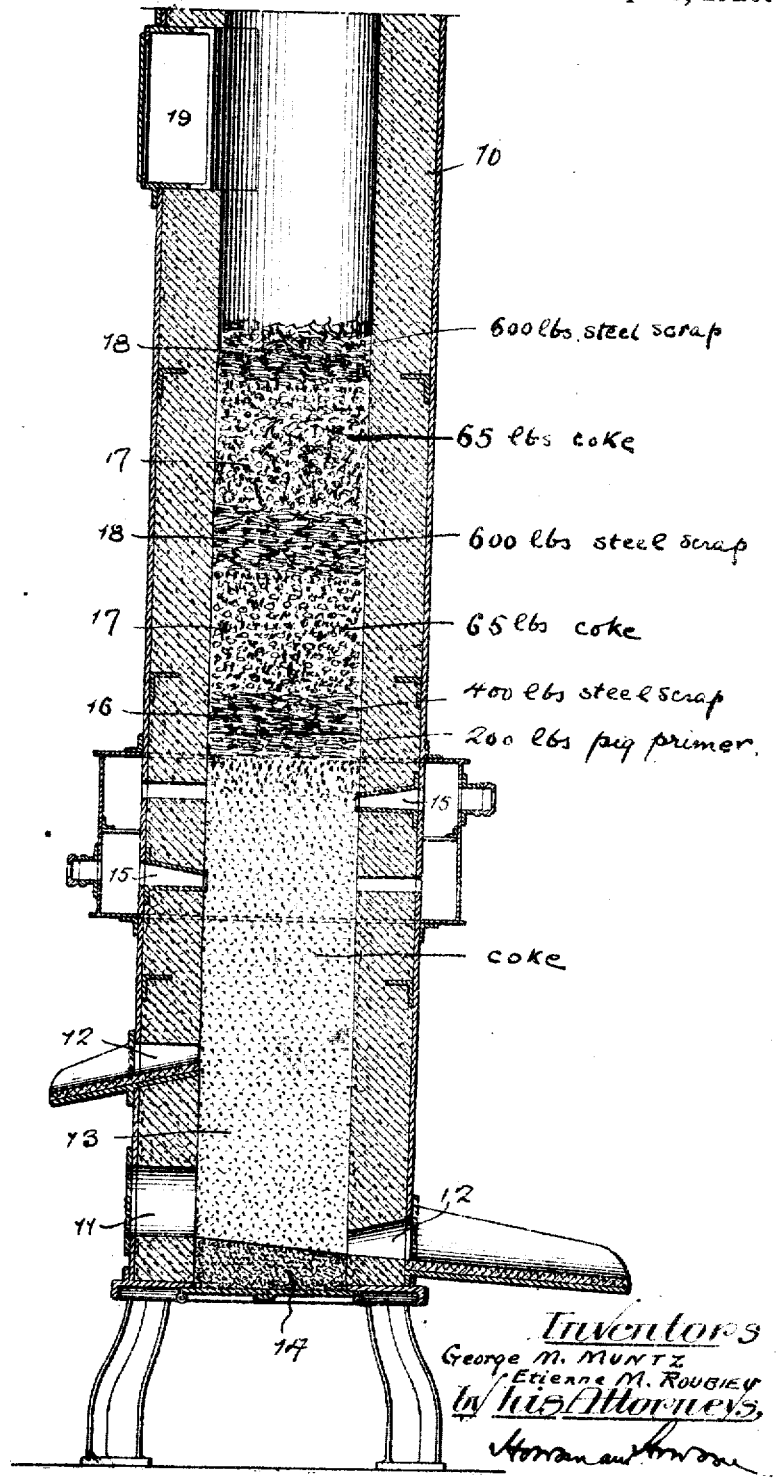

GEORGE M. MUNTZ AND ETIENNE M. ROUBIEU, OF BROOKLYN, NEW YORK, ASSIGNORS TO TROPENAS COMPANY, OF BROOKLYN, NEW YORK, A CORPORATION OF NEW YORK.

METHOD OF UTILIZING STEEL-SCRAP.

1,336,256.  Specification of Letters Patent.  Patented Apr. 6, 1920.

Application filed June 25, 1917. Serial No. 176,849.

*To all whom it may concern:*

Be it known that we, GEORGE M. MUNTZ and ETIENNE M. ROUBIEU, citizens of the United States of America, and residing at Brooklyn, New York, and having a post-office address at 2243 Nostrand avenue, Brooklyn, New York, have invented a certain new and useful Method of Utilizing Steel-Scrap, of which the following is a specification.

Our invention relates to a method of utilizing steel scrap and our object is to provide an improved cupola practice by which a larger percentage of steel scrap may be utilized than has hitherto been possible when the cupola is operated in accordance with established practice.

It is of course common practice to melt in the cupola a mixture of pig iron and steel scrap; but hitherto the proportion of steel scrap has rarely exceeded 40 per cent. of the metallic charge and frequently has not reached as high a proportion as this. This low proportion of steel scrap in the complete charge has been a necessary incident to the defective method commonly employed in operating the cupola. In remedying this, we have found, for instance, that for a converter operation or "blow", when the cupola is supplying molten charges for a converter, we can successfully melt as high as 90 per cent. of scrap to 10 per cent. of pig—a figure never heretofore approached so far as we are aware, while in running the cupola continuously, as for gray iron or malleable iron foundry practice, the proportion of pig iron used is negligible. Inasmuch as steel scrap is far cheaper than pig iron the saving incident to the use of our improved method is readily appreciated.

Melting in a cupola is usually accomplished by superposing alternate amounts of metal and fuel on a previously ignited bed of fuel and enhancing combustion of the fuel by the application of a blast of air through suitable twyers. The various amounts of metal and fuel entering the cupola alternately are usually called metal charges and fuel charges, respectively. In melting steel scrap not only is a higher temperature necessary than for melting pig iron, but also a greater quantity of fuel than is necessary to produce that higher temperature, since the steel absorbs from the fuel a certain amount of carbon, which otherwise would contribute to increase temperature. In other words, fuel must be supplied in sufficient quantity not only to allow the inevitable recarburization of the steel, but also to fuse the metal at a temperature sufficiently high to maintain it in molten condition on the hearth of the cupola and prevent it from solidifying there. This trouble has been understood and it has been attempted to meet the situation by increasing the amount of fuel which is usually inserted between alternate charges of metal. For the reason hereafter explained, this has failed to accomplish the desired result, and it has become general practice to use only a slightly increased amount of fuel and to limit the proportion of scrap to pig iron to from 30% to 40% of scrap to 70% to 60% of pig and even a lower proportion of scrap in order to keep the molten product from solidifying on the hearth. Furthermore, the practice heretofore followed has been to charge the scrap directly upon the fuel and the pig above the scrap, with the thought that the pig would melt first and run down through the scrap and thus aid in the fusion thereof.

Our investigations have disclosed that the practice heretofore followed has been defective in several respects: first of all by reason of failure to heat properly the hearth of the furnace before actual melting is begun, and second in failing to sub-divide the alternate charges of metal and fuel to a sufficient extent to obtain the desired result, and third in failure properly to charge the metal upon the fuel bed or fuel charges.

When the usual full sized charge of metal is fed to the cupola and contains a large proportion of steel scrap, the increased amount of fuel required to melt and recarburize the steel scrap is too deep to be completely ignited simultaneously throughout its depth, with the result that the lower portion of the fuel is reduced to ash before the upper portion is fully fired and the portion first burned is exhausted without accomplishing any perceptible fusion of the superposed charge of metal. Secondly, when the upper portion of the fuel bed incandesces and reaches the temperature necessary for the fusion of the metal charge, it possesses too little body to melt the scrap and bring it to the high temperature necessary to maintain it in fused condition when it falls upon the hearth. We have found that this difficulty is completely eliminated by subdividing the charges. If, for instance, the normal charge is 1200 pounds of metal, we divide this in half and make our charges 600 pounds of metal and in like manner halve the fuel charge, so that if the latter comprises normally 120 pounds of coke, we use for our sub-divided charge, say 60 or 65 pounds of coke. Moreover, we have discovered that the assumption that the pig will melt first when charged above the scrap, is erroneous and that as a matter of fact the scrap melts first and the pig afterward so that no advantage is obtained by charging in the customary manner, but on the other hand an advantage is lost since if pig is charged directly on the fuel, its fusion produces a bath of metal on the hearth which owing to its very high temperature and its lower solidifying point will aid in maintaining the subsequently melted and recarburized steel scrap on the hearth in proper fused condition.

Moreover, by charging the pig first it is assured that the molten product on the hearth and at the tap hole is of such character that it remains in fused condition at a lower temperature than the molten scrap and so prevents the formation of a solid or semi-plastic plug at the tap hole thus affording easy tapping—a most important consideration. If the metal falling first on the hearth is the fused scrap, which requires a high temperature to maintain its fused condition, it is extremely likely that a plug of solidified metal will form at the tap hole which cannot be punctured by the tapping bar, with the result that the entire molten mass solidifies on the hearth of the cupola before it can be withdrawn.

Other variations from established practice will be observed from the following example of the manner in which melting is accomplished in accordance with our process. Assuming the cupola to be empty and the lighting and the tap holes at the hearth level are open, a fire is built upon the hearth and a suitable fuel bed extending from 12 to 14 inches above the top twyers laid thereon. This is ignited and after it is well fired, a 2½ to 3 foot layer of fuel is charged thereon and the blast applied. The fresh fuel forms a cork or plug which forces the heat down upon the hearth, the lighting and tap holes being still maintained open to permit the escape of the products of combustion. This preliminary heating of the hearth, which is continued for 15 to 25 minutes, brings the hearth into very hot condition, which is desired for the reception of the molten metal. A further supply of fuel is then charged upon the fire bed, if necessary, to bring the upper level of the fuel to the melting zone, that is to say, 14 or 15 inches above the twyers and the lighting door and the tap hole are closed so that the products of combustion will pass normally upward to the stack. Upon this fuel we charge a small quantity of pig iron which we call the priming pig iron, and above the pig iron a quantity of steel scrap. Assuming the cupola to be 36 inches in diameter inside the lining, of a capacity of about 5 tons per hour, the first metal charge would be say 200 pounds of pig iron followed by 400 pounds of steel scrap, instead of the usual charge of 1200 pounds of metal. Upon this we add a layer of fuel, say 65 pounds of coke, then a layer, say of 600 pounds, of scrap, and so on. As the charges move downward through the melting zone above the twyers the relatively thin fuel beds are quickly and completely ignited throughout their depth and give their entire heat to the superposed charge of metal which rapidly fuses so there is practically no interruption of the rain of molten metal to the hearth. Owing to the high temperature of the fused scrap and the relatively low melting point of the primer of pig iron, the resulting molten product has no tendency to solidify or the tap hole to become choked. The charges of scrap may succeed each other continuously without interruption as long as the operation of the cupola is continued and in this case the proportion of the original quantity of priming pig to scrap is negligible. If, however, the operation is interrupted, a priming charge of pig iron is introduced at such a time that its subjacent fuel bed, reaches the melting zone substantially simultaneously with the cutting off of the blast, so that it is in position to form a primer when the operation of the cupola is resumed. When the cupola is associated with a converter, the successive charges are so calculated that upon the halt of the operation of the cupola a priming charge of pig iron will be in a position to enter the melting zone when the blast is again started. Preferably each charge will comprise a small proportion of pig iron to steel scrap so that the blast may be cut off at any time and the presence of priming pig assured when the blast is started again.

In the accompanying drawing we have shown a cupola in vertical section to illustrate the operation of the present method.

The cupola 10 is shown in condition for the beginning of the melt after the preliminary heating of the hearth is completed and the lighting and tapping holes 11 and 12 are closed. The fuel bed 13 extends from the sand bed 14 to a point above the twyers 15, while the primer 16 of easily fused material enters the fuel bed 13. The primer is here shown as comprising say 200 lbs. pig iron next to the fuel bed, and 400 lbs. of steel scrap superposed thereon. Successive relatively light layers of fuel 17 and steel scrap 18 are dumped into the cupola through the charging door 19, and the eventual melt drawn off through the lower tapping hole 12. Obviously the pig primer is first melted and maintains its position at the bottom of the melt on the sand bed 14, and particularly at the tapping hole 12, toward which the sand bed slopes.

While any suitable metal for the primer may be employed, it is an added economy to use a portion of one of the melts of the preceding day: thus a few special charges may be melted at the end of every day and divided into small portions and these portions used to form the primers for the operations of the next day. This is merely a matter of added economy since the cupola product is less expensive than pig iron. Ferrosilicon is preferably used as a primer where the cupola is associated with a converter for the production of steel, as this special pig iron supplies the necessary amount of silicon in the molten product to insure satisfactory refining in the converter. We also prefer to use steel scrap low in phosphorus and sulfur inasmuch as no refining for these elements is contemplated in the cupola. It is of course understood that ingredients may be added as necessary to vary the product as may be desired for different types of iron or steel.

As an example of suitable charges for a 36 inch cupola associated with a converter for the production of steel, the following may be given, using standard 9% ferrosilicon:

|       |                                      | Silicon. |
|-------|--------------------------------------|----------|
| 8%    | 50 pounds priming pig at             | 1.5%     |
| 19%   | 115 pounds ferrosilicon at           | 9.0%     |
| 73%   | 435 pounds steel scrap at (about)    | 0.2%     |
| 100%  | 600 pounds converter charge at (about) | 2.0%  |

Using 12% standard ferrosilicon the following proportions would be utilized:—

|       |                                      | Silicon. |
|-------|--------------------------------------|----------|
| 8 %   | 50 pounds priming pig at             | 1.5%     |
| 14.5% | 87 pounds ferrosilicon at            | 12.0%    |
| 77.5% | 463 pounds steel scrap at about      | 0.2%     |
| 100.0%| 600 pounds converter charge at about | 2.0%     |

Preferably each charge will contain substantially the proportions specified where the cupola is used in association with a converter.

Where the cupola is used for gray iron or malleable iron foundry work the first one or two charges will comprise, say 15% pig iron and 85% steel scrap, and thereafter steel scrap alone, adding suitable ingredients, depending upon the character of the final product desired. It is possible in any case to use a high percentage of pig iron in the initial one or two charges and a higher proportion scrap in the later charges, but this is not safe when the cupola is associated with a converter unless the number of charges for a blow of the converter can be predetermined with accuracy and a suitable primer of pig iron charged in position to initiate the succeeding operation of the cupola after it has been halted temporarily for the draw off to the converter.

Various modifications of proportions and material will readily occur to those skilled in the art without departure from what we claim as our invention and we do not limit ourselves to the use of the proportions mentioned or to the details of operation specified.

We claim:

1. The method of melting steel scrap in a cupola, which consists in providing an ignited bed of fuel upon the hearth of the cupola, charging a plug of fuel upon the ignited bed, highly heating the hearth by down blast of the fire thereon, closing the bottom openings of the hearth, charging sufficient fuel on the fire to bring the fuel bed to the level of the melting zone above the twyers, charging thereon a quantity of metal of lower fusing point than steel scrap to form a fused primer on the hearth, and thereafter adding successive, relatively small charges of fuel and of metal alternately, the metal comprising steel scrap in a quantity largely in excess of metal of lower fusing point.

2. The method of melting steel scrap in a cupola, which comprises the steps of highly preheating the hearth, thereafter initiating the melt with metal of lower fusing point than steel scrap, and thereafter melting relatively small charges of metal comprising steel scrap in a quantity largely in excess of metal of low melting point employed in the operation of the cupola.

3. The method of melting steel scrap in a cupola which comprises initiating the melt with metal of lower fusing point than steel scrap, and thereafter melting successive metal charges comprising steel scrap largely in excess of metal of low melting point, the sizes of the charges being such as to insure a substantially continuous rain of molten metal at a high temperature to the hearth of the cupola.

4. The method of melting steel scrap in a cupola which consists in first melting a quantity of metal of low fusing point to cover the tap hole at the hearth of the cupola and thereafter melting steel scrap largely in excess thereof.

5. In cupola practice, the step of preheating the hearth by down draft of a fire thereon, stopping the down draft and thereafter melting metal above the fuel bed.

6. The method of melting steel scrap in a cupola which consists in initiating the melt with metal of lower fusing point than steel scrap and introducing into the cupola during its operation successive charges of fuel, steel scrap, and metal of lower melting point the metal of lower melting point being superposed on the fuel and the steel scrap thereabove.

7. In the melting of steel scrap in a cupola, the steps of introducing into the cupola during its operation a charge of fuel, steel scrap, and metal of lower melting point, the metal of lower melting point being superposed on the fuel and the steel scrap thereabove, and halting the blast as the charge reaches the zone of fusion whereby a primer of metal of lower fusing point than steel scrap is provided on the resumption of the operation of the cupola.

8. The method of melting steel scrap in a cupola which consists in introducing during the operation of the cupola successive charges of fuel and metal, the metal comprising steel scrap in excess of metal of lower fusing point, in the proportion of, for a thirty-six inch cupola, about sixty pounds of fuel and about six hundred pounds of metal in order to insure a substantially continuous rain of molten metal at a high temperature to the hearth of the cupola.

In testimony whereof we have signed our names to this specification.

GEORGE M. MUNTZ.
ETIENNE M. ROUBIEU.